US012684250B2

(12) United States Patent
Ikenoue et al.

(10) Patent No.: US 12,684,250 B2
(45) Date of Patent: Jul. 14, 2026

(54) IMAGE DISPLAYING SYSTEM AND IMAGE DISPLAYING METHOD

(71) Applicant: SONY INTERACTIVE ENTERTAINMENT INC., Tokyo (JP)

(72) Inventors: Shoichi Ikenoue, Chiba (JP); Kenichiro Yokota, Tokyo (JP); Yasunari Hatasawa, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 240 days.

(21) Appl. No.: 18/572,161

(22) PCT Filed: Jun. 6, 2022

(86) PCT No.: PCT/JP2022/022766

§ 371 (c)(1),
(2) Date: Dec. 19, 2023

(87) PCT Pub. No.: WO2023/276566

PCT Pub. Date: Jan. 5, 2023

(65) Prior Publication Data

US 2024/0121520 A1 Apr. 11, 2024

(30) Foreign Application Priority Data

Jul. 2, 2021 (JP) ................................ 2021-110739

(51) Int. Cl.
*H04N 23/76* (2023.01)
*G02B 27/01* (2006.01)
(Continued)

(52) U.S. Cl.
CPC ......... *H04N 23/76* (2023.01); *G02B 27/0172* (2013.01); *G06V 10/141* (2022.01); (Continued)

(58) Field of Classification Search
None
See application file for complete search history.

(56) References Cited

U.S. PATENT DOCUMENTS

| | | | | |
|---|---|---|---|---|
| 12,153,723 | B2 * | 11/2024 | Hall | A63F 13/837 |
| 2016/0270656 | A1 * | 9/2016 | Samec | G02B 27/0172 |
| 2017/0270841 | A1 * | 9/2017 | An | G09G 5/005 |

FOREIGN PATENT DOCUMENTS

| | | | |
|---|---|---|---|
| JP | H05300451 | A | 11/1993 |
| JP | H06019444 | A | 1/1994 |

(Continued)

OTHER PUBLICATIONS

International Search Report for corresponding international application No. PCT/JP2022/022766, dated Aug. 16, 2022, pp. 1-5.

*Primary Examiner* — Darryl V Dottin
(74) *Attorney, Agent, or Firm* — Kilpatrick Townsend & Stockton LLP

(57) ABSTRACT

An image generation apparatus increases an adjustment amount of a luminance distribution to a target value B at a time t0 at which an amount of light entering the eyes of a user changes to such a degree that the change has an influence on an action of photoreceptor cells, to thereby cause a head-mounted display to display an image 310*b* having a luminance increased from that of an original image 310*a*. The image generation apparatus gradually decreases the adjustment amount of the luminance distribution during a restoration period Δt in such a manner that an image 310*c* having the original luminance distribution is displayed at a later time t1.

20 Claims, 7 Drawing Sheets

(51) Int. Cl.

| | |
|---|---|
| ***G06V 10/141*** | (2022.01) |
| ***G06V 10/60*** | (2022.01) |
| ***G06V 40/18*** | (2022.01) |
| ***H04N 9/69*** | (2023.01) |

(52) U.S. Cl.

CPC ............ *G06V 10/60* (2022.01); *G06V 40/193* (2022.01); *H04N 9/69* (2013.01)

(56) References Cited

FOREIGN PATENT DOCUMENTS

| | | | |
|---|---|---|---|
| JP | 2004140736 | A | 5/2004 |
| JP | 2006285064 | A | 10/2006 |
| JP | 2019096984 | A | 6/2019 |
| WO | WO-2007094152 | A1 | 8/2007 |
| WO | WO-2013054728 | A1 | 4/2013 |

* cited by examiner

FIG. 12
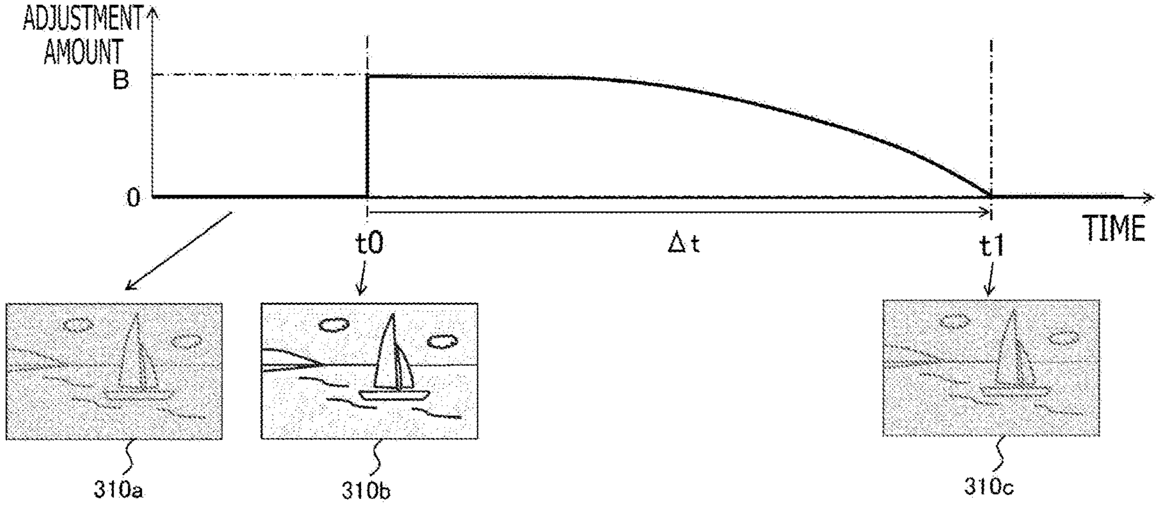
FIG. 13
| LIGHT AMOUNT DIFFERENCE | TARGET VALUE B | RESTORATION PERIOD ΔT | CONVERSION FUNCTION |
|---|---|---|---|
| SMALL | 0 | 0 | — |
| MEDIUM | 10% | 30sec | F1 |
| LARGE | 30% | 50sec | F2 |
320
FIG. 14
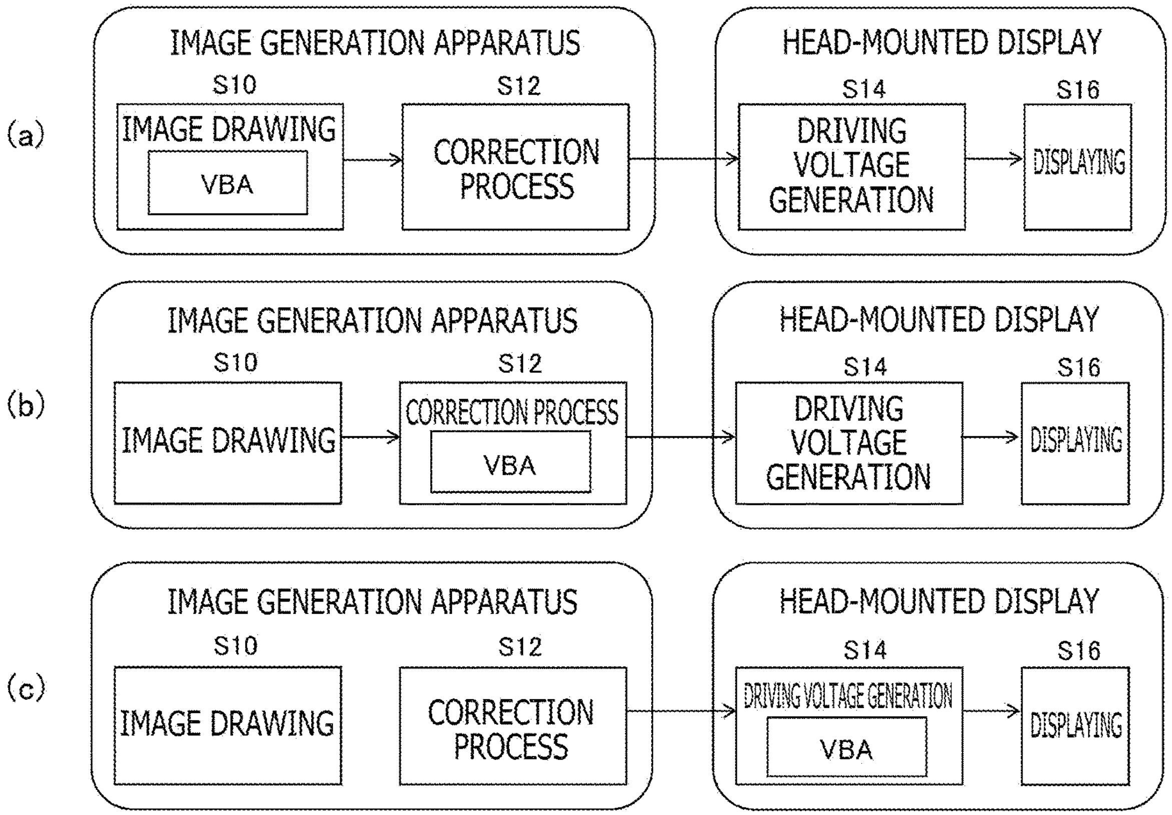

IMAGE DISPLAYING SYSTEM AND IMAGE DISPLAYING METHOD

TECHNICAL FIELD

The present invention relates to an image displaying system and an image displaying method for displaying an image of content.

BACKGROUND ART

Conventionally, various technologies for improving the image quality in video display of a television broadcast, a delivered moving image, and so forth have been developed. In recent years, in addition to a technology that improves the resolution and the color gamut, a technology for processing a signal of high dynamic range (HDR) that indicates an increased range of luminance is becoming popular. Since a permissible range of luminance according to the HDR is approximately 100 times wide in comparison with that of conventional standard dynamic range (SDR), a target that is felt dazzling in the real world such as reflection light of the sunlight can be represented with higher reality also on an image. Not only in a television broadcast and a delivered moving image but also in the world of computer graphics such as a game image, the reality can be provided to a virtual world by representation according to the HDR.

Meanwhile, becoming popular is a system in which a movement of the head of a user who wears a head-mounted display is detected, and a space of a displaying target is represented in a visual field corresponding to the detected movement, so that an image world that gives a feeling of presence can be represented. There has also been developed a walk-through system by which, by a physical movement of a user who wears a head-mounted display, the user can virtually walk around in a space displayed as a video. There has also been proposed a technology which decreases, utilizing dark adaptation of a person who wears a head-mounted display, the luminance of a display section to suppress a sense of dazzling and achieve elongation of the life of the entire apparatus (for example, refer to PTL 1).

CITATION LIST

Patent Literature

[PTL 1]
PCT Patent Publication No. WO2013/054728

SUMMARY

Technical Problem

If the compatible luminance range increases as described above, then high-luminance light such as intensive reflection light can be represented realistically, and high-definition representation with fine gradations can be achieved in principle also in a region of a low or medium luminance. However, even if many gradations are allocated to an object that is important in content or the like in original image data, in such a manner that a high-resolution feeling is presented, it can occur, from various causes such as data conversion performed before the data is displayed, visibility of a person, and so forth, that the object does not appear with a very high definition or turns out to be hard to see.

The present invention has been made in view of such a problem as described above, and it is an object of the present invention to provide a technology for allowing a viewer to visually recognize an image commensurate with an image display quality that content or a display apparatus originally has.

Solution to Problem

A certain mode of the present invention relates to an image displaying system. The image displaying system includes a luminance distribution controlling section that detects, on the basis of predetermined information, such a degree of change in amount of light entering eyes of a user as to decrease visibility in an action of photoreceptor cells and controls adjustment of a luminance distribution of an image in accordance with a rule corresponding to the change in amount of light, a luminance conversion section that converts a luminance represented by an image value in accordance with the rule, and an outputting section that outputs data of the image having the converted luminance.

Another mode of the present invention relates to an image displaying method. The image displaying method includes a step of detecting, on the basis of predetermined information, such a degree of change in amount of light entering eyes of a user as to decrease visibility in an action of photoreceptor cells, a step of controlling adjustment of a luminance distribution of an image in accordance with a rule corresponding to the change in amount of light, a step of converting a luminance represented by an image value, in accordance with the rule, and a step of outputting data of the image having the converted luminance.

It is to be noted that any combinations of the components described above and representations of the present invention where they are converted between a method, an apparatus, a system, a computer program, a data structure, a recording medium, and so forth are also effective as modes of the present invention.

Advantageous Effect of Invention

With the present invention, it is possible to allow a viewer to visually recognize an image commensurate with an image display quality that content or a display apparatus originally has.

BRIEF DESCRIPTION OF DRAWINGS

FIG. 12 is a view schematically depicting a manner of temporal control of luminance distribution adjustment, which is implemented by the luminance distribution controlling section in the present embodiment.

FIG. 13 is a view exemplifying a data structure of a luminance adjustment rule that is stored in a luminance adjustment rule storage section of the image generation apparatus in the present embodiment.

FIG. 14 is a view depicting variations of a timing at which an adjustment process of luminance distribution by a light-dark transition is performed in the image displaying system of the present embodiment.

DESCRIPTION OF EMBODIMENT

Figure 1:
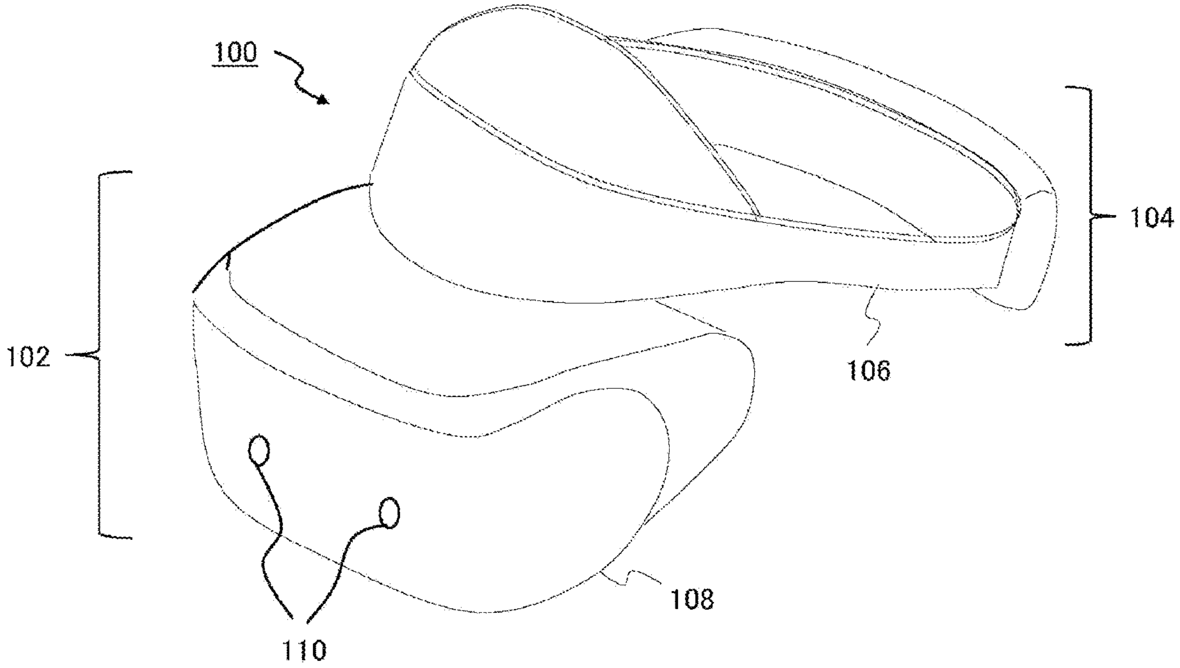
FIG. 1 is a view depicting an example of an appearance of a head-mounted display according to an embodiment.

FIG. 1 depicts an example of an appearance of a head-mounted display 100. In this example, the head-mounted display 100 includes an outputting mechanism section 102 and a mounting mechanism section 104. The mounting mechanism section 104 includes a mounting band 106 that surrounds the head of a user when the head-mounted display 100 is worn, to implement fixing of the apparatus. The outputting mechanism section 102 includes a housing 108 having such a shape that it covers the left and right eyes in a state in which the user wears the head-mounted display 100, and includes, in an inside thereof, a display panel that directly faces the eyes of the user when the head-mounted display 100 is worn by the user.

The housing 108 further includes, in the inside thereof, eyepiece lenses that are positioned between the display panel and the eyes of the user when the head-mounted display 100 is worn and that enlarge a viewing angle of the user. The head-mounted display 100 may further include a speaker and an earphone at a position that corresponds to each of the ears of the user when the head-mounted display 100 is worn. Further, the head-mounted display 100 has a built-in motion sensor and detects not only a translational motion and a rotational motion of the head of the user who wears the head-mounted display 100 but also a position and a posture of the head at each time.

In this example, the head-mounted display 100 includes a stereo camera 110 on a front surface of the housing 108 such that it captures an image of a surrounding real space as a moving image with a visual field corresponding to the line of sight of the user. If the captured image is displayed immediately, then what is generally called video see-through by which a situation of a real space in a direction in which the user faces is viewed as it is can be implemented. Further, if a virtual object is drawn on a picture of a real object appearing in the captured image, then augmented reality (AR) can be implemented.

Figure 2:
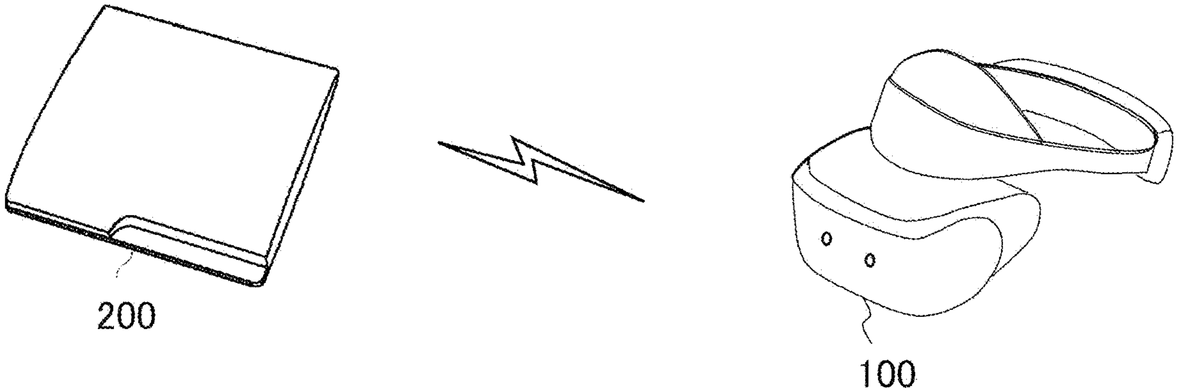
FIG. 2 is a view depicting an example of a configuration of an image displaying system according to the present embodiment.

FIG. 2 depicts an example of a configuration of an image displaying system according to the present embodiment. The head-mounted display 100 is connected to an image generation apparatus 200 by wireless communication or an interface for connecting to peripheral equipment such as a universal serial bus (USB) interface. The image generation apparatus 200 may be connected further to a server through a network. In this case, the server may provide an online application of a game or the like in which a plurality of users can participate through the network, to the image generation apparatus 200.

The image generation apparatus 200 specifies the position of the point of view and the direction of the line of sight on the basis of the position and the posture of the head of the user who wears the head-mounted display 100, generates such a display image as to have a field of view corresponding to the specified position and direction, and outputs the generated image to the head-mounted display 100. To this extent, the purpose for displaying an image may vary. For example, the image generation apparatus 200 may generate a virtual world that is a stage of a game as a display image while progressing in an electronic game, or may cause a still image or a moving image to be displayed for appreciation or information provision regardless of a virtual world or a real world. If a panoramic image is displayed with a wide angle of view centered at the point of view of the user, then a feeling of immersion in the displayed world can be given to the user.

It is to be noted that part or all of the functions of the image generation apparatus 200 may otherwise be provided in the inside of the head-mounted display 100. In a case where all the functions of the image generation apparatus 200 are built in the head-mounted display 100, the illustrated image processing system is implemented by the single head-mounted display 100.

Figure 3:
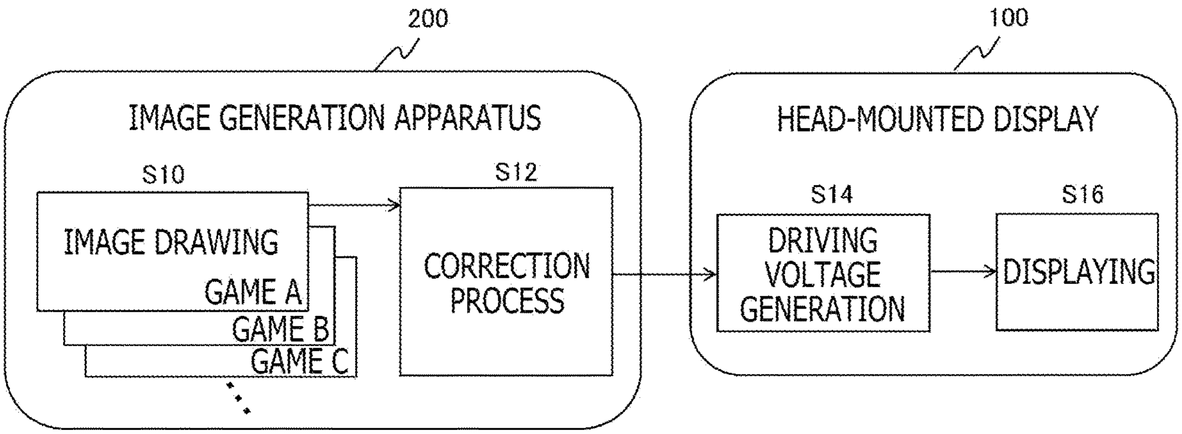
FIG. 3 is a view exemplifying an outline of a flow of processing for image displaying performed by the image displaying system of the present embodiment.

FIG. 3 exemplifies an outline of a flow of processing for image displaying that is performed by the image displaying system of the present embodiment. First, the image generation apparatus 200 draws an image in accordance with a program of content to be processed (S10). Typically, the image generation apparatus 200 generates a moving image by continuously drawing images at a predetermined rate. In this case, the image generation apparatus 200 determines a field of view for an image on the basis of information not only of the head-mounted display 100 but also of the latest position and posture of the head of the user, which information is acquired at that time point, and sequentially generates an image corresponding to the line of sight of the user.

The process in S10 is determined for each piece of content and is represented as an individual rectangle for each piece of content "game A," "game B," "game C," and so on in the figure. By the process in S10, RGB luminances are given as a pixel value to each of pixels configuring an image plane. Here, the image generation apparatus 200 may perform a conversion process for confining pixel values determined through detailed arithmetic operation such as ray tracing to a displayable luminance range, by tone mapping or the like.

Then, the image generation apparatus 200 performs a correction process necessary for display for the drawn image (S12). In a case where the head-mounted display 100 is a displaying destination, the image generation apparatus 200 carries out distortion correction and reprojection in S12. The distortion correction is correction for distorting an original image in an opposite direction according to a distortion aberration in advance such that an image free from distortion is visually recognized when it is appreciated through the eyepiece lenses provided in the head-mounted display 100. The reprojection is a process of correcting the field of view of an image to the latest state, taking a movement of the head after an elapsed period of time from starting of the drawing in S10 into consideration.

Further, the image generation apparatus 200 carries out color gamut conversion and so forth according to a display characteristic of the head-mounted display 100 as occasion demands. The head-mounted display 100 sequentially receives data of the image corrected in this manner and generates a driving voltage corresponding to RGB luminances represented by the pixel values (S14). It is to be noted that transmission of image data from the image generation apparatus 200 to the head-mounted display 100 may involve a general process such as quantization and dequantization of pixel values. Then, the head-mounted display 100 drives the display panel with the generated drive voltage to sequentially display images (S16).

Figure 4:
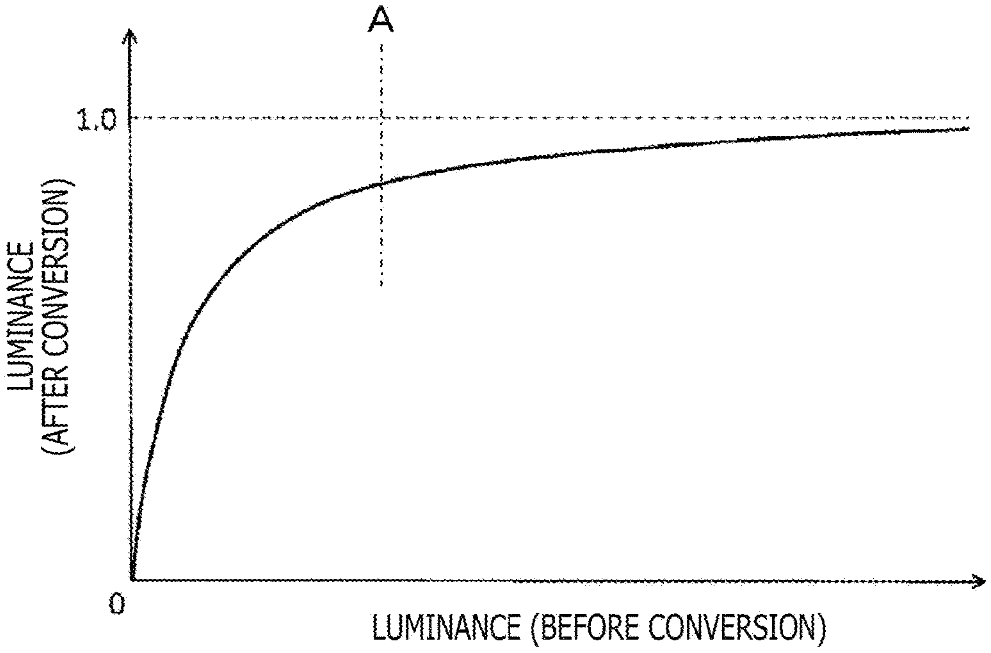
FIG. 4 is a view exemplifying a conversion function used when tone mapping is performed in S10 of FIG. 3.

FIG. 4 exemplifies a conversion function (hereinafter referred to as a "tone curve") used when tone mapping is performed in S10 of FIG. 3. FIG. 4 depicts a Reinhard function that is a representative tone curve, and implements such conversion that the gradation is suppressed from a low luminance region toward a high luminance side, taking a human visual characteristic into consideration. By setting and selecting a tone curve appropriately, even if the characteristic or the compatible luminance range of a display of the displaying destination changes, it is possible to cause an image to be displayed similarly with a color tone intended by a content creator.

Here, the maximum value 1.0 of the tone curve corresponds to an upper limit of the luminance displayable by the head-mounted display 100, and in the case of HDR, the maximum light emission luminance is 1000 ($cd/m^2$) or the like. Further, according to such a tone curve as depicted in the figure, for example, to regions of a low luminance lower than a luminance A and a medium luminance, a greater number of gradations are allocated. If the displayable luminance range increases, then especially in the regions mentioned, image representation that presents a high-resolution feeling is enabled by a fine color tone change.

Figure 5:
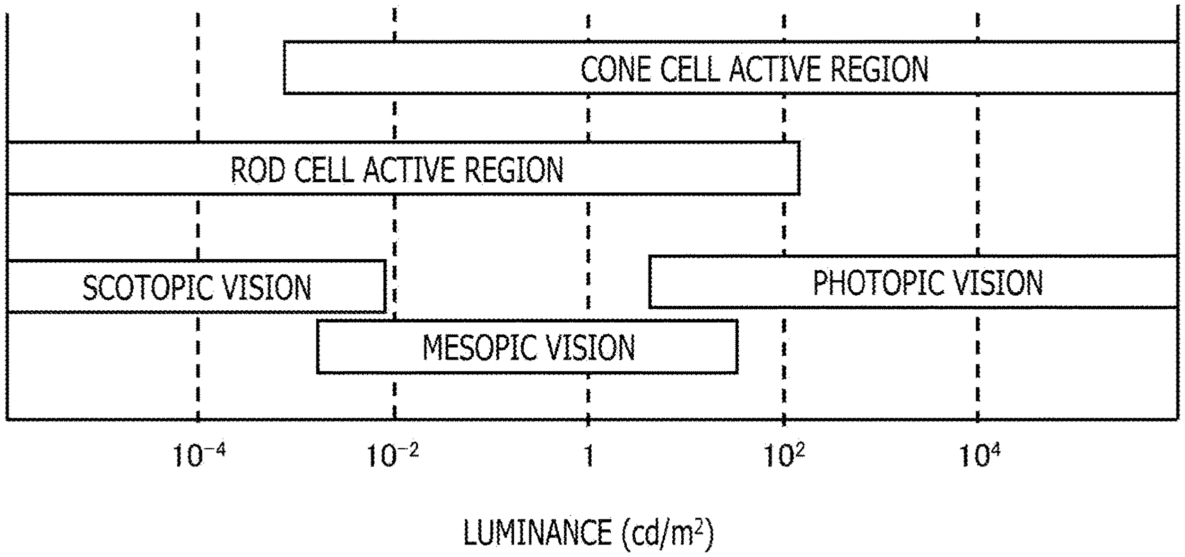
FIG. 5 is a view depicting a relation between a luminance range of light stimulation and an active region of photoreceptor cells.

Meanwhile, in a case where the head-mounted display 100 is configured such that it blocks out external light, the user immediately after wearing the head-mounted display 100 experiences switching of an action of photoreceptor cells from photopic vision to mesopic vision or scotopic vision in response to a sudden decrease of the amount of light entering the eyes. FIG. 5 depicts a relation between the luminance range of light stimulation and the active region of photoreceptor cells (for example, refer to "Chapter 16: Human eye sensitivity and photometric quantities," [online], [searched Jun. 19, 2021], Internet <URL: https://www.ecse.rpi.edu/~schubert/Light-Emitting-Diodes-dot-org/Sample-Chapter.pdf>).

As depicted in the figure, by light stimulation of approximately $10^{-2}$ ($cd/m^2$) or less, only rod cells act, and by light stimulation of approximately $10^2$ ($cd/m^2$) or more, only cone cells act. In an intermediate luminance range between them, both rod cells and cone cells act. The cone cell is high in sensitivity to colors and how a thing looks, and the rod cell is high in sensitivity to brightness of light. Generally, the visual sense when only rod cells mainly act is called scotopic vision, the visual sense when only cone cells act is called photopic vision, and the visual sense when both of them act is called mesopic vision. At the time of the transition from the photopic vision to the mesopic vision or the scotopic vision, as an autonomous function of the retina for light intensity, dark adaptation in which, after the visibility drops once, the eyes gradually adjust to the darkness and the visibility increases occurs with the visual sense.

Figure 6:
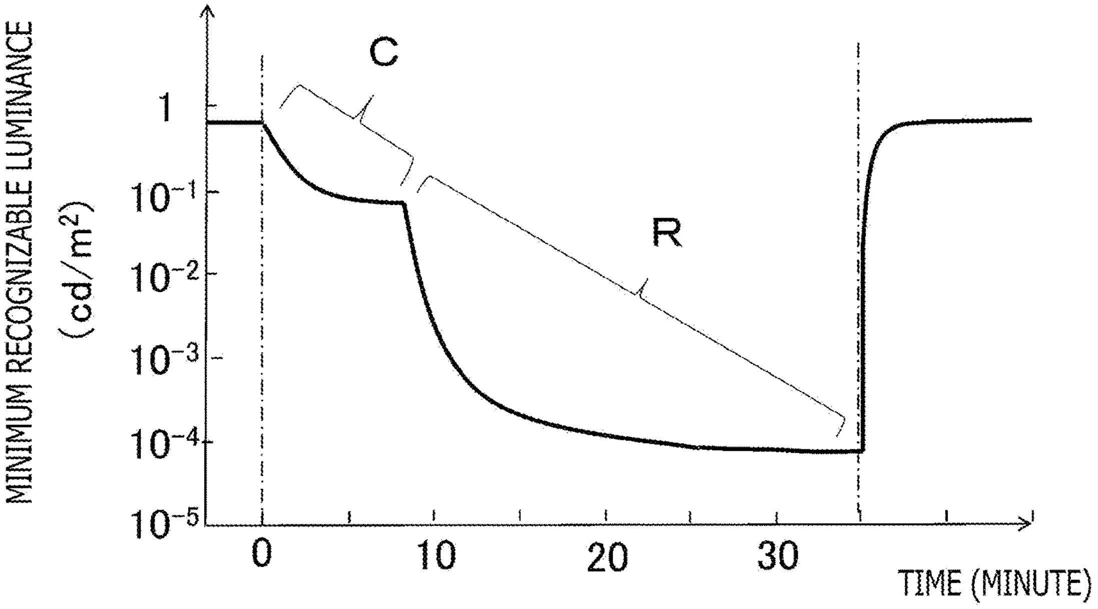
FIG. 6 is a view exemplifying a change in sensitivity of photoreceptor cells in dark adaptation.

FIG. 6 exemplifies a change in sensitivity of photoreceptor cells in dark adaptation. FIG. 6 depicts a change in minimum luminance of light that can be visually recognized, with respect to the time axis in the horizontal direction. It is signified that, as the recognizable minimum luminance decreases, the sensitivity increases. The time at which the amount of light entering the eyes of the user decreases suddenly as a result of such an event that the user wears the head-mounted display 100 from a state in which the sensitivity is saturated as scotopic vision is set as 0. At this time, the sensitivity of cone cells first increases as indicated by a curve C until it is saturated, and thereafter, the sensitivity of rod cells increases as indicated by a curve R until it is saturated.

The period of time until the sensitivity of cells is saturated depends also upon the difference in light amount. As an example, the adaptation time period of cone cells is approximately several tens of seconds to several minutes, and the adaptation time period of rod cells is approximately 30 minutes to one hour. It is to be noted that, after dark adaptation, in a case where the amount of light entering the eyes increases suddenly as a result of such an event that the user removes the head-mounted display 100, switching to photopic vision is performed. At this time, light adaptation in which the sensitivity of photoreceptor cells is decreased to reduce the dazzling occurs. In the figure, light adaptation occurs at a time of 35 minutes. The light adaptation is achieved in a shorter period than the dark adaptation.

By such a change in action of photoreceptor cells in response to a change in amount of light entering the eyes, the visibility of the user for a displayed image drops temporarily in a state in which the adaptation is not sufficient. Especially, as the brightness of the surrounding environment the user has seen before the user wears the head-mounted display 100 increases, and as the brightness of an image being displayed decreases, the difference in light amount increases and the visibility is likely to degrade. In recent years, a technology for analyzing an image captured by the stereo camera 110 to specify a movement of a user has been put into practical use by visual simultaneous localization and mapping (VSLAM) or the like.

In this case, in order to achieve sufficient analysis accuracy, image capturing in a somewhat bright environment is required, and therefore, the difference in light amount by wearing and removal of the head-mounted display 100 is likely to become great. Consequently, it is possible that, to the user immediately after wearing the head-mounted display 100, the entire display image looks darker than in reality. Further, the user cannot identify a change in color tone at a portion of the image at which the image is originally represented with fine gradations but the luminance is low, and therefore feels that it is difficult to see or has an impression that the image quality is not good. This may possibly lead to evaluation of the entire content.

A similar phenomenon can occur not only immediately after the user wears the head-mounted display 100 but also immediately after switching from a bright screen image to a dark screen image. Therefore, in the present embodiment, the luminance distribution of a display image is adjusted taking it as a trigger that a difference of such a degree that it changes the action of photoreceptor cells occurs with the amount of light that enters the eyes of the user. Here, the "luminance distribution" signifies a distribution indicated by a set of RGB luminances the pixels configuring an image have, and it is also possible to regard the luminance distribution as a luminance histogram. If attention is paid to each pixel, then the "adjustment of the luminance distribution" is conversion of luminance values that follows a predetermined rule.

Figure 7:
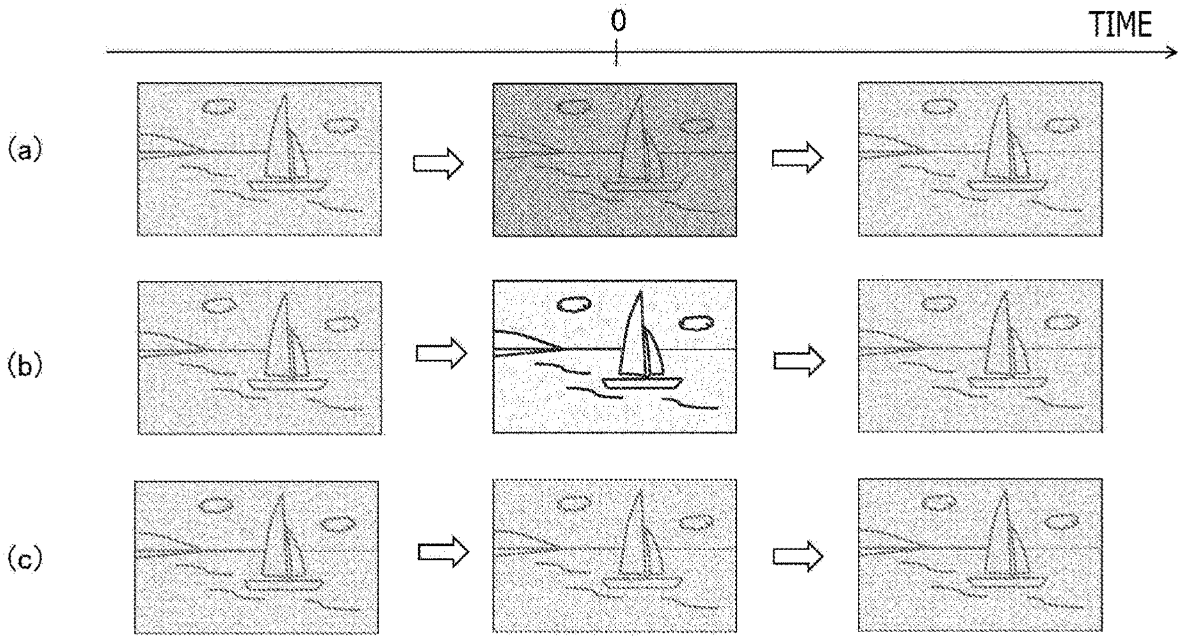
FIG. 7 is a view illustrating an adjustment effect of a luminance distribution in dark adaptation in the present embodiment.

FIG. 7 is a view illustrating an adjustment effect of the luminance distribution in dark adaptation. The horizontal direction in the figure indicates the time axis, and the time at which the light amount decreases suddenly is set to 0, as in FIG. 6. Note that it is assumed that the luminance of an image as content does not change. Part (a) schematically depicts a transition of an image visually recognized by the user in a case where the luminance is not adjusted. In this case, at a time 0 at which the light amount decreases, the recognized image becomes dark, and as the adaptation proceeds, the difficulty in viewing gradually decreases.

Part (b) schematically depicts a transition of a display image in which the luminance distribution is adjusted by the present embodiment. In particular, at the time 0 at which the light amount decreases, the image displaying system increases the luminance in such a manner as to cancel such a decrease of the visibility as depicted in Part (a). In practice, the increase rate of the luminance may be changed depending upon the original luminance such that the luminance in a high-luminance region which is less likely to be affected by the degradation of the visibility is maintained as it is whereas the luminance in low- and medium-luminance regions in which difficulty in viewing is expected is increased. Then, the luminance distribution having been increased is gradually returned to the original luminance distribution as the visibility is restored by dark adaptation.

Part (c) schematically depicts a transition of an image visually recognized by the user with such an adjustment of the luminance distribution of a display image as in Part (b). By adjusting the luminance distribution of an image in such a manner as to cancel a change in visibility, even if the amount of light entering the eyes changes, the luminance and the gradation of the visually recognized image are maintained to a certain degree, and it is possible to continue to allow an image of high quality to be recognized stably. It is to be noted that, needless to say, in a case where the timing at which the user wears the head-mounted display 100 is set to the time 0, the images at the left end in Part (a) and Part (c) are not recognized. However, they are depicted as images to be visually recognized in a state in which the sensitivity of photoreceptor cells is saturated.

Figure 8:
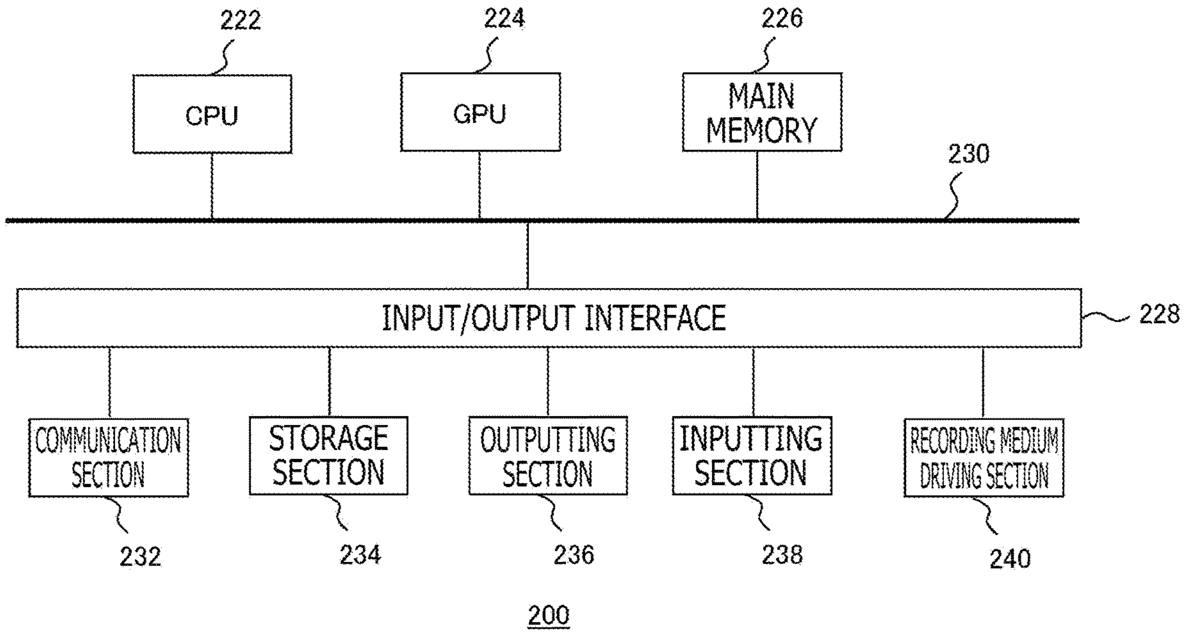
FIG. 8 is a view depicting a configuration of an internal circuit of an image generation apparatus in the present embodiment.

FIG. 8 depicts a configuration of an internal circuit of the image generation apparatus 200. The image generation apparatus 200 includes a central processing unit (CPU) 222, a graphics processing unit (GPU) 224, and a main memory 226. The components mentioned are connected to each other by a bus 230. Further, an input/output interface 228 is connected to the bus 230.

Connected to the input/output interface 228 are a communication section 232 including a peripheral equipment interface of USB, IEEE 1394, or the like and a network interface of a wired or wireless LAN, a storage section 234 such as a hard disk drive, a nonvolatile memory, or the like, an outputting section 236 that outputs data to the head-mounted display 100, an inputting section 238 that receives an input of data from the head-mounted display 100, and a recording medium driving section 240 that drives a removable recording medium such as a magnetic disk, an optical disk, or a semiconductor memory.

The CPU 222 executes an operating system stored in the storage section 234 to control the entire image generation apparatus 200. Further, the CPU 222 executes various programs read out from a removable recording medium and loaded in the main memory 226 or downloaded through the communication section 232. The GPU 224 has a function of a geometry engine and a function of a rendering processor, and performs a drawing process in accordance with a drawing instruction from the CPU 222 and outputs a result of the drawing process to the outputting section 236. The main memory 226 includes a random access memory (RAM) and stores programs and data necessary for processing.

Figure 9:
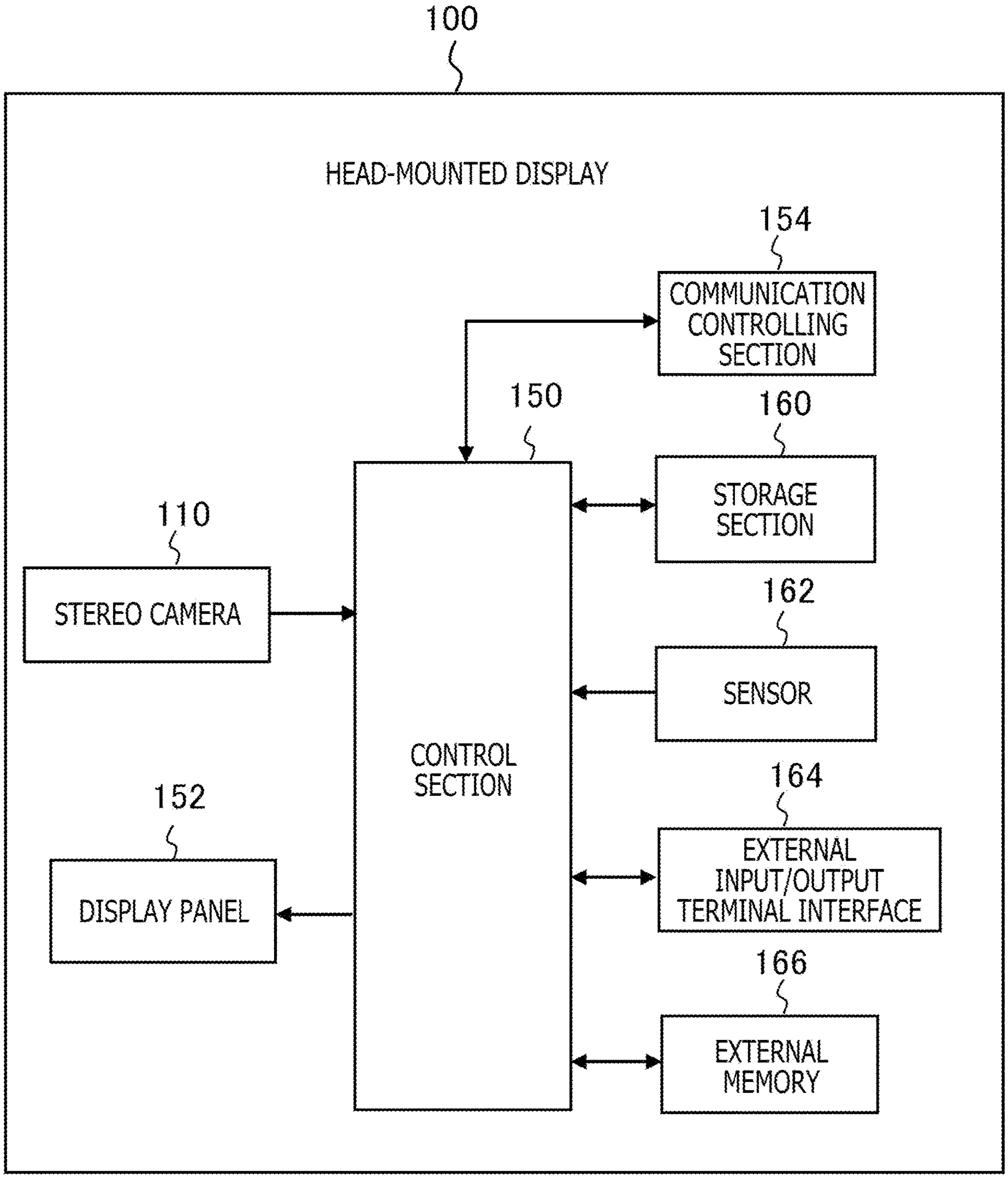
FIG. 9 is a view illustrating an internal configuration of the head-mounted display in the present embodiment.

FIG. 9 exemplifies an internal configuration of the head-mounted display 100. A control section 150 is a main processor that processes signals such as an image signal and a sensor signal, instructions, and data and outputs a result of the processing. The stereo camera 110 supplies data of a captured image at a predetermined rate to the control section 150. A display panel 152 includes a light emission panel of liquid crystal, organic EL, or the like and a control mechanism for the light emission panel, and receives an image signal from the control section 150 and displays an image.

A communication controlling section 154 transmits data inputted from the control section 150 to the outside by wired or wireless communication through a network adapter or an antenna not depicted. Further, the communication controlling section 154 receives data from the outside by wired or wireless communication through the network adapter or the antenna and outputs the data to the control section 150. A storage section 160 temporarily stores data, parameters, operation signals, and so forth to be processed by the control section 150.

A sensor 162 includes a motion sensor, measures posture information such as an angle of rotation and an inclination of the head-mounted display 100, and sequentially supplies the posture information to the control section 150. The sensor 162 further includes a contact sensor that detects that the user wears the head-mounted display 100, and an infrared sensor that captures an image of a state of the pupils of the user who is looking at the display panel, as occasion demands. Also in this case, the sensor 162 sequentially supplies various kinds of information thus acquired to the control section 150. For example, the infrared camera may be part of a point-of-fixation detector that detects a point of fixation of the user on a displayed image.

An external input/output terminal interface 164 is an interface for connecting to peripheral equipment such as a USB controller. An external memory 166 is an external memory such as a flash memory. The control section 150 can supply image data and sound data to the display panel 152 and to an earphone or a speaker not depicted to cause outputting therefrom, or can supply them to the communication controlling section 154 to cause transmission to the outside.

Figure 10:
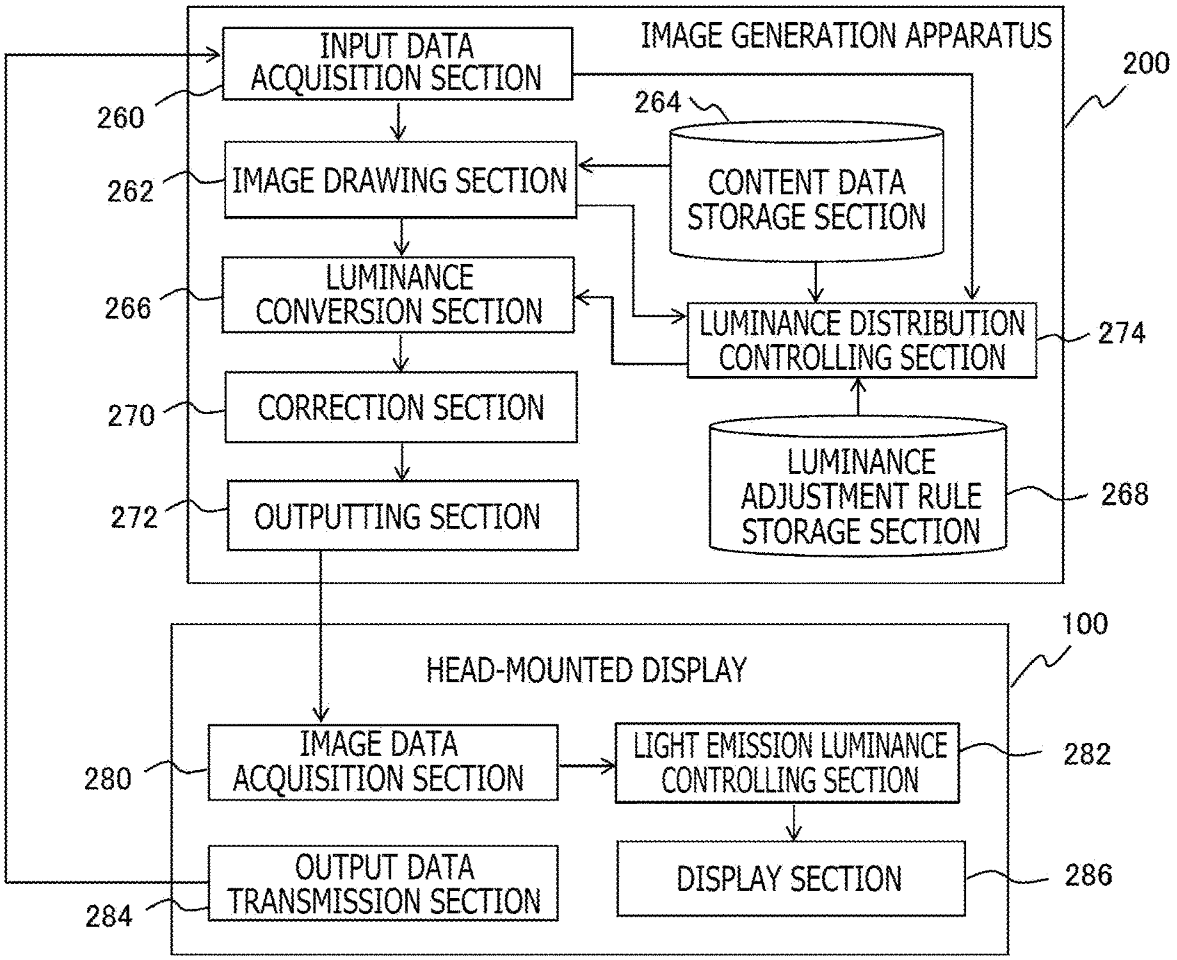
FIG. 10 is a view depicting a configuration of functional blocks of the image generation apparatus and the head-mounted display in the present embodiment.

FIG. 10 depicts a configuration of functional blocks of the image generation apparatus 200 and the head-mounted display 100 in the present embodiment. Although the image generation apparatus 200 may perform general information processing, for example, for progressing in an electronic game or communicating with a server as described above, FIG. 10 depicts the configuration specifically focusing on functions for generating a display image. It is to be noted that at least some of the functions of the image generation apparatus 200 depicted in FIG. 10 may be incorporated in the head-mounted display 100. Alternatively, at least some of the functions of the image generation apparatus 200 may be incorporated in a server that is connected to the image generation apparatus 200 through a network.

Further, the functional blocks depicted in FIG. 10 can be implemented, in terms of hardware, by such components as the CPU, the GPU, the control section, the various memories, and the sensor depicted in FIG. 8 or 9 and are implemented, in terms of software, by programs that are loaded from a recording medium or the like into a memory and that demonstrate various functions such as a data inputting function, a data retaining function, an image processing function, and a communication function. Accordingly, it is recognized by those skilled in the art that the functional blocks mentioned can be implemented in various forms by hardware only, by software only, or by a combination of them, and the functional blocks are not limited to any of them.

The image generation apparatus 200 includes an input data acquisition section 260 that acquires data transmitted from the head-mounted display 100, an image drawing section 262 that draws an image of content, a content data storage section 264 that stores data of the content, a luminance conversion section 266 that converts a luminance given as a pixel value, a luminance distribution controlling section 274 that controls adjustment of a luminance distribution compatible with human visual adaptation, a luminance adjustment rule storage section 268 that stores an adjustment rule for the luminance distribution, a correction section 270 that performs correction for displaying, and an outputting section 272 that outputs image data obtained after correction to the head-mounted display 100.

The input data acquisition section 260 acquires data of a measurement value of the motion sensor, an image captured by the stereo camera 110, and the like, which are transmitted from the head-mounted display 100, at a predetermined rate. Further, the input data acquisition section 260 sequentially acquires predetermined information necessary for controlling the luminance distribution compatible with visual adaptation from the head-mounted display 100. It is sufficient if the "predetermined information" here is data based on which it can be detected that a difference has occurred in the amount of light entering the eyes of the user to such a degree that it causes degradation of the visibility (hereinafter referred to as a "light-dark transition"). For example, the input data acquisition section 260 acquires information that is acquired by the contact sensor and that indicates wearing or removal of the head-mounted display 100. The input data acquisition section 260 may acquire an image of the pupils of the user captured by the infrared camera or state information of the pupils obtained from the image. The input data acquisition section 260 may further acquire details of a user operation relating to a change in a displayed image, such as an operation for content being displayed or calling of a system screen image, from an inputting apparatus not depicted.

The image drawing section 262 acquires a position and a posture of the head-mounted display 100 at a predetermined rate and draws an image of a displaying target with a visual field corresponding to them. This process corresponds to S10 in FIG. 3. Here, the image drawing section 262 performs ray tracing or rasterization in accordance with a program of content being executed, to determine a pixel value composed of RGB factors. The content data storage section 264 stores therein data necessary for drawing of an image, such as model data of an object or data relating to a configuration of a displayed world.

It is sufficient if the process performed by the image drawing section 262 is generation of an image, and the process may be, in addition to image drawing by computer graphics, such a process as decoding/decompression of live-shot video data or merging of a live-shot video and computer graphics. In any case, the content data storage section 264 may store metadata representative of a timing at which the luminance of the entire displayed image changes by a predetermined value or more, such as a timing of switching of a displayed scene.

The luminance conversion section 266 converts a luminance range for a pixel value obtained as a result of drawing into a range suitable for the display panel of the head-mounted display 100. For example, the luminance conversion section 266 retains therein such a tone curve as depicted in FIG. 4 and carries out tone mapping using the tone curve. Further, when a light-dark transition is detected, the luminance conversion section 266 adjusts the luminance distribution under the control of the luminance distribution controlling section 274. Specifically, the luminance conversion section 266 converts RGB luminances that are pixel values, in accordance with a rule determined by the luminance distribution controlling section 274.

The luminance distribution controlling section 274 detects or predicts a light-dark transition on the basis of information acquired from the input data acquisition section 260 and so forth, and controls the luminance conversion section 266 in such a manner that the luminance distribution of the pixel values changes in accordance with a rule corresponding to the light-dark transition. The luminance distribution controlling section 274 detects the timing of the light-dark transition, by using at least one of the following measures.

1. To acquire the fact that the head-mounted display 100 is worn by a user, from a detection result by the contact sensor
2. To acquire the fact that the general luminance (average luminance) of an image being displayed has decreased, from a change in size of the pupils of the user captured by the infrared camera
3. To acquire the fact that the general luminance (average luminance) of an image being displayed has decreased, from a drawing result by the image drawing section 262 or metadata of the content
4. To acquire a decrease of the screen image luminance due to switching of content of a displaying target or switching between a content screen image and a system screen image, from a drawing result by the image drawing section 262 or from details of a user operation, metadata, and so forth The luminance distribution controlling section 274 may further predict a timing of a light-dark transition, by using at least one of the following measures.

1. To detect starting of the head-mounted display 100 and predict that a user wears the head-mounted display 100
2. To predict a timing at which the general luminance of an image being displayed decreases, from metadata of content.

The luminance distribution controlling section 274 not only may detect a timing of a light-dark transition as described above but also may acquire a difference in light amount at the light-dark transition and reflect the difference on the degree of adjustment of the luminance distribution. Qualitatively, as the difference in light amount is larger, the luminance distribution controlling section 274 increases the degree of adjustment of the luminance distribution. For example, the luminance distribution controlling section 274 acquires an image captured by the stereo camera 110 of the head-mounted display 100 and acquires the brightness of the environment in which the user is present on the basis of an average luminance or a luminance histogram of the image.

As the brightness of the environment in which the user is present increases, the drop of the light amount when the head-mounted display 100 is worn increases, and therefore, the visibility further degrades. Accordingly, the luminance distribution controlling section 274 increases the increase amount of the luminance at the time when the head-mounted display 100 is worn as the brightness of the surrounding environment increases. Further, the difference in light amount may be determined on the basis of the difference in or the rate of change in size of the pupils of the user, the difference in average luminance or luminance histogram of the displayed image, or the like.

Here, the "difference in light amount" acquired by the luminance distribution controlling section 274 need not be a rigorous physical amount. That is, it is sufficient if the degree of the difference in light amount is defined in a plurality of stages or the like, according to information on which the difference in light amount is based such as the ambient brightness. At this time, in the luminance adjustment rule storage section 268, the stages of the difference in light amount and adjustment rules for the luminance distribution are stored in an associated relation with each other. Further, the luminance distribution controlling section 274 controls a restoration process of the luminance distribution corresponding to the visual adaptation. For example, if the difference in light amount at a light-dark transition is great, then the period of time until the visibility is improved sufficiently by dark adaptation becomes long. Accordingly, the luminance distribution controlling section 274 may decrease the restoration speed of the luminance distribution to restore the luminance distribution in a longer period of time as the difference in light amount at a light-dark transition increases.

The luminance distribution controlling section 274 may change either one of or both the adjustment amount of the luminance distribution and the restoration time period on the basis of the difference in light amount. Alternatively, the luminance distribution controlling section 274 may set both of them to fixed values. Further, the luminance distribution controlling section 274 may determine whether the adjustment of the luminance distribution is to be started over from the beginning or to be restarted from the middle, according to the time until the head-mounted display 100 is worn again after it is removed or according to the ambient brightness.

The correction section 270 performs, for a drawn image or an image for which luminance conversion has been performed, correction necessary for displaying such as distortion correction, reprojection, or color gamut correction. This process corresponds to S12 of FIG. 3. In a case where a display image is to be made look stereoscopic, the correction section 270 may generate images for the left eye and the right eye having a parallax therebetween from an original reference image. Alternatively, the image drawing section 262 may directly generate images for the left eye and the right eye. The outputting section 272 sequentially sends out data of a corrected image supplied from the correction section 270, to the head-mounted display 100. In a case where an image is to be made look stereoscopic, the outputting section 272 sends out the data in such an order that the image for the left eye is placed in the left half of the image and the image for the right eye is placed in the right half of the image.

The head-mounted display 100 includes an output data transmission section 284 that transmits data to be used for drawing of a display image and data necessary for luminance distribution control to the image generation apparatus 200, an image data acquisition section 280 that acquires data of an image transmitted from the image generation apparatus 200, a light emission luminance controlling section 282 that controls the light emission luminance of the display panel on the basis of the image data, and a display section 286 that drives the display panel to display an image.

The output data transmission section 284 transmits data necessary for drawing of a display image, such as an image captured by the stereo camera 110 and a measurement value of the motion sensor included in the sensor 162, at a predetermined rate to the image generation apparatus 200. Further, the output data transmission section 284 sequentially transmits data necessary for luminance distribution control compatible with visual adaptation to the image generation apparatus 200. The data is a predetermined one or ones of a result of wearing/removal detection of the head-mounted display 100, information indicative of a state of the pupils, an image obtained by capturing the surrounding environment, and so forth.

The image data acquisition section 280 acquires the data of the image transmitted from the image generation apparatus 200. At this time, the image data acquisition section 280 sequentially acquires data of pixel values sent out in a raster order or the like from the image generation apparatus 200 and supplies the data to the light emission luminance controlling section 282. The light emission luminance controlling section 282 determines a driving voltage for a light emitting element in the display panel on the basis of the RGB luminances represented by the pixel values. This process corresponds to S14 of FIG. 3. The display section 286 causes corresponding elements of the display panel to sequentially emit light with the driving voltages generated by the light emission luminance controlling section 282 to display an image. This process corresponds to S16 of FIG. 3.

Figure 11:
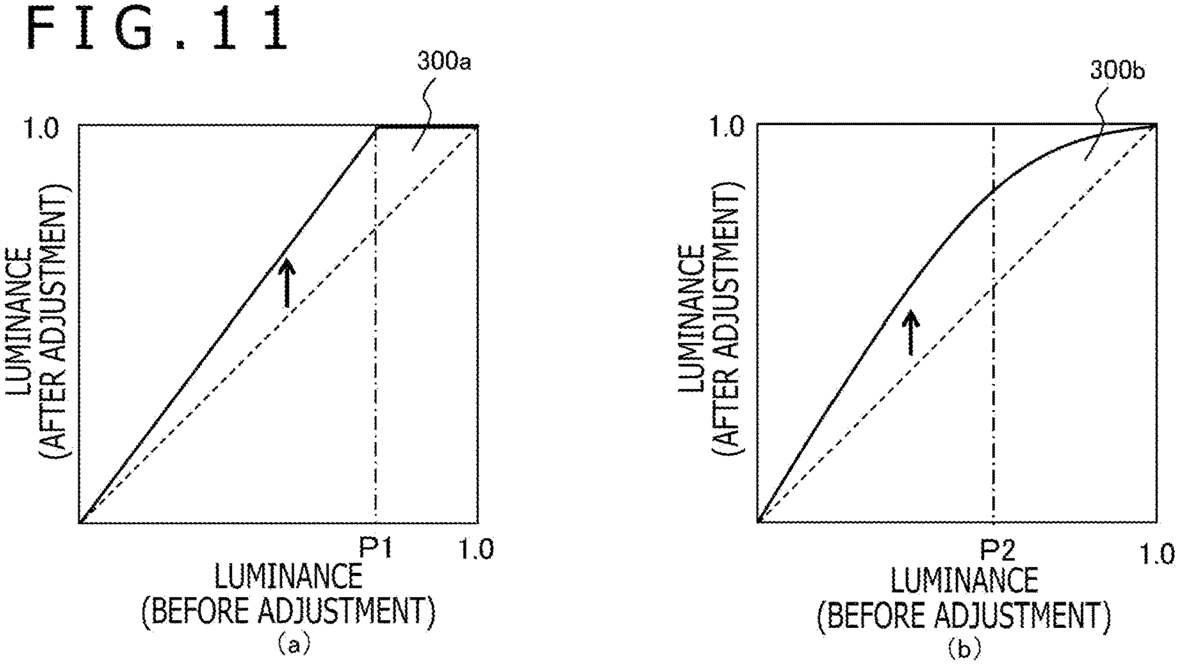
FIG. 11 is a view exemplifying a conversion rule of luminance that is used for luminance conversion by a luminance conversion section under the control of a luminance distribution controlling section in the present embodiment.

FIG. 11 exemplifies a conversion rule of the luminance that is used for luminance conversion by the luminance conversion section 266 under the control of the luminance distribution controlling section 274. In Part (a) and Part (b), a luminance distribution in a case where adjustment related to visual adaptation is not performed is indicated by a broken line, and a change in the luminance distribution in a case where such adjustment as just described is performed is indicated by a thick line. It is to be noted that the luminances are normalized such that the highest luminance before and after the adjustment is determined as 1.0. Part (a) depicts a conversion rule that increases any luminance equal to or lower than a predetermined luminance P1 defined by $0<P1<1.0$ linearly by multiplying the luminance by a coefficient $k=1.0/P1$ and that converts all luminances higher than P1 to the maximum luminance.

Part (b) depicts a conversion rule that increases the luminance in a curve in which the increase rate of the luminance is in the maximum at a predetermined luminance P2 defined by $0<P2<1.0$. The function that provides the curve is not limited to any kind and may be a power function like a gamma curve or may be such a tone cove as depicted in FIG. 4. In any case, in the example depicted in the figure, by increasing the luminance with certainty in the low luminance region and the medium luminance region, a gradation can be allocated preferentially to a region of the luminance that becomes difficult to see due to a light-dark transition by which the light amount decreases. The predetermined luminances P1 and P2 may be determined according to a luminance region significant in the content or a difference in light amount.

It is to be noted that, although the "adjustment amount" of the luminance distribution in the present embodiment is, in a rigorous sense, a variable that depends upon the luminance before the adjustment, conceptually it may be a difference from that in the state in the case of no adjustment indicated by the broken line, and various definitions of it are permissible. For example, the "adjustment amount" may be the area of a region 300*a* or 300*b* defined by the thick line representative of the conversion rule used when the adjustment is performed and the broken line in the case where the adjustment (conversion) is not performed, that is, the integral value of the change amount of the respective luminances. Alternatively, the "adjustment amount" may be the coefficient k by which the luminance before adjustment is to be multiplied, or the increase amount (maximum increase amount) after adjustment of the predetermined luminance P1 or P2. Further, the conversion rule depicted is a mere example and may be a function that is discontinuous depending upon a range of the luminance or may be represented as a lookup table that associates the luminances before and after the conversion with each other.

FIG. 12 schematically depicts a manner of temporal control of luminance distribution adjustment, which is implemented by the luminance distribution controlling section 274. An upper part in the figure depicts a temporal change in adjustment amount of the luminance distribution with respect to a time axis in the horizontal direction. If a transition from light to dark due to a decrease of the light amount occurs at a time t0, then the luminance distribution controlling section 274 increases the adjustment amount of the luminance distribution from 0 to a target value B. Then, the luminance distribution controlling section 274 gradually decreases the adjustment amount in such a manner that a state in which no adjustment is performed is established, that is, the adjustment amount reaches 0, at a time t1 after a restoration period Δt.

In the present embodiment, it is important to prevent representation of colors represented by RGB luminances from being impaired by a light-dark transition. Accordingly, the restoration period Δt is substantially a period of time until the sensitivity of the color vision increases and is saturated in cone cells from among the human visual adaptations. In particular, Δt is a period of time of approximately several tens of seconds and is set to Δt=50 seconds as an example. However, the restoration time period Δt or the target value B of the adjustment amount may be changed depending on the difference in light amount by a light-dark transition as described hereinabove.

Further, the gradual decrease rate of the adjustment amount may be increased gradually as depicted in the figure or may be fixed. According to such control as just described, as depicted in a lower part of the figure, such a transition of a displayed image is implemented that an original image 310*a* is displayed before the time t0, and at the time t1, the image 310*a* changes to an image 310*a* having an increased luminance, whereafter the luminance gradually decreases until an image 310*c* equivalent to the original image 310*a* is reached. This makes it possible to allow an image of high quality to be recognized continuously and stably even if a light-dark transition occurs as depicted in Part (c) of FIG. 7.

It is to be noted that, in a case where the light-dark transition at the time t0 arises from the fact that the head-mounted display 100 is worn, since the image in a period before then is not visually recognized, it is possible to increase the luminance in advance. Moreover, for example, in a case where the user removes or re-wears the head-mounted display 100 in the middle of the restoration period Δt, the luminance distribution controlling section 274 may determine in response to the timing whether or not the adjustment of the luminance distribution is to be redone.

For example, if the head-mounted display 100 removed once is re-worn within a predetermined period of time, which can be regarded as a minute period of time such as five seconds, then the luminance distribution controlling section 274 resumes the gradual decrease from the adjustment amount at the point of time at which the head-mounted display 100 was removed. Alternatively, the luminance distribution controlling section 274 continues the gradual decrease of the adjustment amount of the luminance distribution while determining as if the head-mounted display 100 had not been removed. Consequently, it can be avoided that, although the sensitivity of cone cells has increased, the adjustment amount is increased to the target value B uselessly. On the other hand, in a situation in which it can be regarded that the increase of the sensitivity has not proceeded, such as in a case where the head-mounted display 100 has been removed for a longer period of time or in another case where the head-mounted display 100 is removed immediately after it is worn first, the adjustment of the luminance distribution may be started over from the beginning.

Further, if the luminance distribution controlling section 274 starts the adjustment of the luminance distribution taking it as a trigger that the head-mounted display 100 is worn, then it may continue the adjustment of the restoration period Δt regardless of a change in any other factor. For example, even if a transition from light to dark in a displayed image due to such an event as switching of a scene or content of a display target or switching between a system screen image and a content screen image occurs in the middle of the restoration period Δt, the luminance distribution controlling section 274 causes the luminance distribution adjustment by wearing of the head-mounted display 100 to take precedence. This can avoid that the luminance distribution is raised unnaturally in a state in which visual adaptation has proceeded.

FIG. 13 exemplifies a data structure of a luminance adjustment rule stored in a luminance adjustment rule storage section 263 of the image generation apparatus 200. A luminance adjustment rule table 320 in this example associates the target value B of the adjustment amount of the luminance distribution, the restoration period Δt, and the conversion function of the luminance distribution with the difference in light amount in a light-dark transition. Here, the light amount difference is derived from the ambient brightness, the size change of the pupils, a change in the average luminance or luminance histogram of the displayed image, and so forth as described hereinabove, and is set, in the example depicted in the figure, to one of three levels "small," "medium," and "large."

In this example, it is set that, where the light amount difference is "small," the luminance distribution is not adjusted. Specifically, the target value B and the restoration period Δt are set to "0" and the conversion function is not set. Where the light amount difference is "medium," the target value B is set to 10%, the restoration period Δt is set to 30 seconds, and the conversion function is set to "F1." Where the light amount difference is "large," the target value B is set to 30%, the restoration period Δt is set to 50 seconds, and the conversion function is set to "F2." Although the target value B here is representation of a maximum increase ratio from the original luminance or the like in a percentage, the unit of it varies depending upon the definition of the adjustment amount. The conversion function is information for identifying such a conversion rule of the luminance as exemplified in FIG. 11, and a final shape thereof is determined based on a combination thereof with the target value B.

By restoring the luminance distribution with an adjustment amount and a period of time that increase as the light amount difference in a light-dark transition increases, as depicted in FIG. 13, adjustment that matches visual adaptation can be implemented. Further, in such a case that the head-mounted display 100 is worn in a dark environment or in a like case, if the light amount difference is so small that a visual change does not occur, then by omitting the adjustment itself of the luminance distribution, wasteful processing can be omitted. It is to be noted that, although, in the example depicted in the figure, it is set that all of the target value B of the adjustment amount, the restoration period Δt, and the conversion function depend upon the light amount difference, the present embodiment is not limited to this, and only some of the parameters may be varied. Also the number of levels of the light amount difference is not limited to any value.

FIG. 14 depicts variations of the timing at which an adjustment process of the luminance distribution by a light-dark transition is performed in the image displaying system. Here, the displaying process of an image is roughly divided into four stages, namely, image drawing (S10), a correction process (S12), driving voltage generation (S14), and displaying (S16) as depicted in FIG. 3. Further, the adjustment process of the luminance distribution by a light-dark transition is referred to as the "visual brightness adaptation (VBA)" and is indicated by individual blocks. Part (a) depicts the mode described hereinabove, in which the luminance conversion section 266 adjusts the luminance distribution, prior to correction by the correction section 270, under the control of the luminance distribution controlling section 274.

The luminance conversion section 266 originally has a function of adjusting the luminance range in a tone curve suitable for content, according to the compatible luminance range or the like of the head-mounted display 100. Since the luminance conversion section 266 takes charge of some of the functions of the VBA, a content creator can set a period during which the VBA is to be effective or such an adjustment rule as depicted in FIG. 13, according to the content. Meanwhile, there is a concern that consistency of the adjustment mode may be lost in the platform of the entire image displaying system. Further, it is considered that it is difficult to deal with a case where it is desired to invalidate the VBA because of control outside the content such as recording or delivery.

Part (b) depicts a mode in which the correction section 270 of the image generation apparatus 200 adjusts the luminance distribution under the control of the luminance distribution controlling section 274. Since the correction process by the correction section 270 is common to pieces of content, according to this mode, consistency of the adjustment mode is secured in the platform of the entire image displaying system. Further, in a case where a power function is used as the conversion function for adjustment, simultaneous adjustment with, for example, digamma/gamma processes which are originally performed by the correction section 270, that is, gamma correction, is possible, and the processing load does not increase. It is to be noted that, in a case where the VBA is to be implemented with a gamma curve, it is sufficient if the gamma value is gradually made closer to its original value during a restoration period.

However, in the mode of Part (b), it is necessary to incorporate a logic for causing the VBA to function into all functional bocks that output image data (video signal), for example, a functional block that generates an image to be provided by a system other than the content. Further, also on an image viewed by a user who does not wear the head-mounted display 100, adjustment by the VBA is reflected by recording or delivery.

Part (c) depicts a mode in which the light emission luminance controlling section 282 of the head-mounted display 100 adjusts the luminance distribution. In this case, the luminance distribution controlling section 274 may also be incorporated in the light emission luminance controlling section 282. Since the driving voltage generation process by the light emission luminance controlling section 282 is also common to pieces of content, also by the present mode, consistency of the adjustment mode is secured in the platform of the entire image displaying system. Further, there is no necessity to incorporate a logic for causing the VBA to function into the other functional blocks since this is adjustment performed on a final display image. Further, since this adjustment is a process performed in the inside of the head-mounted display 100, it does not have an influence on a recorded image and a delivered image.

Further, in a case where a power function is used as the conversion function for adjustment, simultaneous adjustment with, for example, gamma correction according to a characteristic of the display panel is possible in the driving voltage generation process, and the processing load does not increase. In this manner, since the adjustment timing of the luminance distribution at a light-dark transition is not limited to any timing, an appropriate embodiment is selected taking the above-described advantages and disadvantages, processing performances of the individual apparatuses, required processing accuracy, and so forth into consideration.

It is to be noted that, in a case where a user interface capable of adjusting the light emission luminance is provided in the head-mounted display 100 separately from the luminance adjustment mechanism in the inside of content, it is desirable to prevent complications of control by invalidating the function of the VBA during a period during which the adjustment operation is effective. Alternatively, both of them may be validated simultaneously such that the control according to the visual adaptation and the operation by the subjectivity of the user are effective at the same time.

With the present embodiment described above, in a system in which an image of content is displayed on a head-mounted display, a timing at which the amount of light entering the eyes of the user changes is detected, and when such a difference in light amount that it has an influence on the action of photoreceptor cells occurs, the luminance distribution of the image is adjusted. Consequently, a decrease of the visibility due to the difference in light amount can be compensated for on the display side, and it is possible to allow the user to continue to visually recognize an image commensurate with the original quality or performance of the content and the head-mounted display.

For example, by increasing the luminance in the low luminance region and the medium luminance region according to a drop in light amount caused by wearing of the head-mounted display, the high-resolution feeling of color representation can be maintained irrespective of a drop of the visibility. Further, by gradually restoring the original adjustment amount in approximately several tens of seconds in which the sensitivity of cone cells among human visual adaptations is saturated, working on the color vision can be performed efficiently. As a result, especially in content or a head-mounted display compatible with a wide luminance range such as the HDR, a rich video experience can be provided in which the high image quality the content or the head-mounted display originally has is not impaired.

The present invention has been described in connection with the embodiment. The embodiment is exemplary, and it can be understood by those skilled in the art that various modifications are possible in combinations of the components and the processes in the embodiment and that also such modifications fall within the scope of the present invention.

For example, in the present embodiment, mainly focusing on switching from photopic vision to mesopic or scotopic vision due to a drop of the light amount, the luminance of an image is increased. This is expected to produce a greater effect, for example, since the human dark adaptation is longer than the light adaptation, and since an image generally has a luminance substantially of a medium or lower luminance level and, at switching to mesopic vision or scotopic vision, difficulty in viewing becomes conspicuous. On the other hand, if the luminance distribution is adjusted in a direction opposite to the direction of the change in the light amount entering the eyes of the user, then advantageous effects similar to those by the present embodiment can be attained against visibility degradation not only when the light amount decreases but also when the light amount increases.

In short, the adjustment technology of the luminance distribution can similarly be applied also to switching from scotopic vision or mesopic vision to photopic vision when the light amount increases. For example, at switching from a generally dark image to a scene having many regions represented with a high luminance or at switching of the display to another piece of content having such an image as just described or a system screen image, the luminance is decreased once, and then the original luminance is restored gradually. This case is similar to the embodiment except that the luminance is adjusted in the decreasing direction. This makes it possible to prevent dazzle or difficulty in viewing caused by entering of intense light to photoreceptor cells that are in a state in which the sensitivity is high by mesopic vision or scotopic vision.

INDUSTRIAL APPLICABILITY

As described above, the present invention can be applied to various processing apparatuses such as a content processing apparatus, an image generation apparatus, a game apparatus, and a display apparatus and to a system that includes any of them.

REFERENCE SIGNS LIST

100: Head-mounted display
110: Stereo camera
150: Control section
152: Display panel
154: Communication controlling section
160: Storage section
162: Sensor
200: Image generation apparatus
222: CPU
224: GPU
226: Main memory
234: Storage section
236: Outputting section
260: Input data acquisition section
262: Image drawing section
264: Content data storage section
266: Luminance conversion section
268: Luminance adjustment rule storage section
270: Correction section
272: Outputting section
274: Luminance distribution controlling section
280: Image data acquisition section
282: Light emission luminance controlling section
284: Output data transmission section
286: Display section

The invention claimed is:

1. An image displaying system comprising:
one or more processors; and
one or more computer-readable media storing instructions which, when executed by the one or more processors, cause the image displaying system to perform operations comprising:
detecting, on a basis of predetermined information, a degree of change in an amount of light entering eyes of a user, wherein the degree of change causes a decrease of visibility in an action of photoreceptor cells of the eyes of the user;
controlling adjustment of a luminance distribution of an image in accordance with a rule corresponding to the degree of change;
converting a luminance represented by an image value in accordance with the rule; and
outputting data of the image having the converted luminance.

2. The image displaying system according to claim 1, wherein the operations further comprise increasing the luminance in response to a decrease of the amount of light and decreasing the luminance in response to an increase of the amount of light.

3. The image displaying system according to claim 1, wherein the operations further comprise converting the luminance in such a manner that a rate of change in the luminance depends upon the luminance before the adjustment.

4. The image displaying system according to claim 1, wherein the operations further comprise converting the luminance with use of a gamma curve to carry out adjustment.

5. The image displaying system according to claim 1, wherein the operations further comprise acquiring a degree of the change in the amount of light on the basis of the predetermined information and controlling the adjustment of the luminance distribution with an adjustment amount according to the degree.

6. The image displaying system according to claim 1, wherein the operations further comprise determining an adjustment amount of the luminance distribution at a time at which the change occurs, as a target value, and gradually decreases the adjustment amount in such a manner as to reach a state free from adjustment.

7. The image displaying system according to claim 4, wherein the operations further comprise acquiring a degree of the change in the amount of light on the basis of the predetermined information and causes a state free from the adjustment to be reached in a period of time according to the degree.

8. The image displaying system according to claim 1, wherein the operations further comprise detecting, on a basis of a detection result of a contact sensor provided in a head-mounted display that is a displaying destination of an image, a decrease of the amount of light caused by wearing of the head-mounted display.

9. The image displaying system according to claim 1, wherein the operations further comprise detecting the change in the amount of light on a basis of a change in size of a pupil appearing in an image captured by an infrared camera provided in a head-mounted display that is a displaying destination of the image.

10. The image displaying system according to claim 1, wherein the operations further comprise detecting the change in the amount of light by acquiring a change in the luminance of an image being displayed, on a basis of a result of drawing of the image or on a basis of metadata of a content for which the image is displayed.

11. The image displaying system according to claim 1, wherein the operations further comprise detecting the change in the amount of light by specifying switching of a content of a displaying target or switching between a content screen image and a system screen image on a basis of details of a user operation.

12. The image displaying system according to claim 1, wherein the operations further comprise:

detecting starting of a head-mounted display that is a displaying destination of an image;

predicting a decrease of the amount of light to be caused by wearing of the head-mounted display; and controlling the luminance in such a manner as to increase at a point of time before the wearing.

13. An image displaying method comprising:

detecting, on a basis of predetermined information, a degree of change in an amount of light entering eyes of a user, wherein the degree of change causes a decrease of visibility in an action of photoreceptor cells of the eyes of the user;

controlling adjustment of a luminance distribution of an image in accordance with a rule corresponding to the degree of change;

converting a luminance represented by an image value, in accordance with the rule; and outputting data of the image having the converted luminance.

14. A non-transitory computer readable storage medium comprising computer program instruction that, when executed by one or more processors, cause the one or more processors to perform actions comprising:

detecting, on a basis of predetermined information, a degree of change in an amount of light entering eyes of a user, wherein the degree of change causes a decrease of visibility in an action of photoreceptor cells of the eyes of the user;

controlling adjustment of a luminance distribution of an image in accordance with a rule corresponding to the degree of change;

converting a luminance represented by an image value, in accordance with the rule; and outputting data of the image having the converted luminance.

15. The image displaying system according to claim 1, wherein the rule comprises:

increasing a luminance equal to or lower than a first predetermined luminance by multiplying the luminance by a coefficient, wherein the coefficient determined based on the first predetermined luminance; and/or increasing the luminance based on a function in which a rate of increase of the luminance has a maximum at a second predetermined luminance.

16. The image displaying system according to claim 15, wherein the second predetermined luminance is determined based on a luminance region or based on the degree of change.

17. The image displaying method according to claim 13, wherein the rule comprises:

increasing a luminance equal to or lower than a first predetermined luminance by multiplying the luminance by a coefficient, wherein the coefficient determined based on the first predetermined luminance; and/or increasing the luminance based on a function in which a rate of increase of the luminance has a maximum at a second predetermined luminance.

18. The image displaying method according to claim 17, wherein the second predetermined luminance is determined based on a luminance region or based on the degree of change.

19. The non-transitory computer readable storage medium according to claim 14, wherein the rule comprises:

increasing a luminance equal to or lower than a first predetermined luminance by multiplying the luminance by a coefficient, wherein the coefficient determined based on the first predetermined luminance; and/or increasing the luminance based on a function in which a rate of increase of the luminance has a maximum at a second predetermined luminance.

20. The non-transitory computer readable storage medium according to claim 19, wherein the second predetermined luminance is determined based on a luminance region or based on the degree of change.

* * * * *